(12) United States Patent
Wagner

(10) Patent No.: US 8,146,718 B2
(45) Date of Patent: Apr. 3, 2012

(54) AUTOMATIC SYSTEM BRAKE

(75) Inventor: Jon Wagner, Redwood City, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 817 days.

(21) Appl. No.: 12/241,437

(22) Filed: Sep. 30, 2008

(65) Prior Publication Data

US 2010/0078270 A1 Apr. 1, 2010

(51) Int. Cl.
F16D 65/36 (2006.01)
(52) U.S. Cl. ......................... 188/171; 188/156
(58) Field of Classification Search .......... 188/156–164, 188/171, 173; 192/222, 226, 18 B, 12 BA, 192/53.2, 54.4, 84.1, 84.2, 84.21, 84.31, 192/90; 310/77, 103, 162; 414/277, 279
See application file for complete search history.

(56) References Cited

U.S. PATENT DOCUMENTS

| | | | | |
|---|---|---|---|---|
| 2,217,464 A * | 10/1940 | Arnold | | 188/171 |
| 2,290,406 A * | 7/1942 | Chambers | | 188/164 |
| 2,705,058 A * | 3/1955 | Harter | | 188/164 |
| 3,605,958 A * | 9/1971 | McCarthy | | 188/171 |
| 3,868,034 A * | 2/1975 | Goodacre et al. | | 414/670 |
| 4,352,415 A * | 10/1982 | Powell | | 188/156 |
| 5,067,593 A * | 11/1991 | Tanaka et al. | | 187/350 |
| 5,107,156 A * | 4/1992 | Jaun et al. | | 310/162 |
| 6,234,737 B1 * | 5/2001 | Young et al. | | 414/277 |
| 6,665,554 B1 * | 12/2003 | Charles et al. | | 600/427 |
| 7,575,407 B2 * | 8/2009 | Tsujimoto | | 414/279 |
| 2006/0144653 A1 * | 7/2006 | Eberle et al. | | 188/171 |

* cited by examiner

Primary Examiner — Christopher Schwartz

(57) ABSTRACT

The translation apparatus comprises an elongate track, an elongate fixed member and a stage. The fixed member extends parallel to the track in a fixed lengthwise position relative to the track. The stage is mounted on the track and is capable of movement along the track. The stage comprises a motive force generator, a rotatable member and a rotary brake. The motive force generator is operable to move the stage along the track. The rotatable member is coupled with the fixed member in a manner that converts motion of the stage along the track into rotation of the rotatable member. The rotary brake is selectively operable to apply a braking torque to the rotatable member. The coupling between the rotatable member and the fixed member converts the braking torque applied to the rotatable member into a braking force applied to the stage.

20 Claims, 5 Drawing Sheets

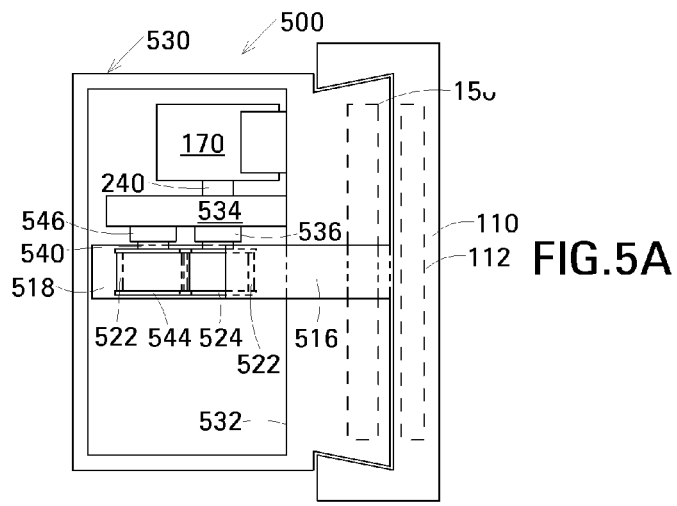
FIG.5A
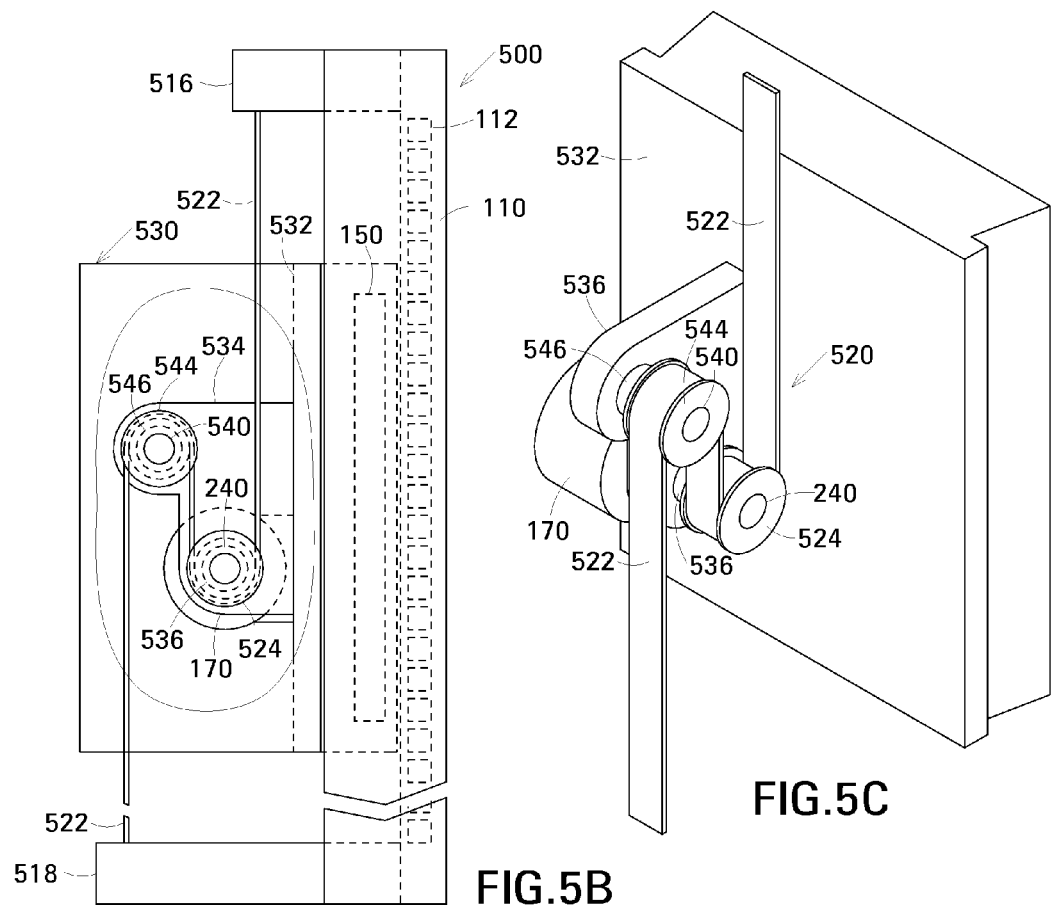
FIG.5B
FIG.5C

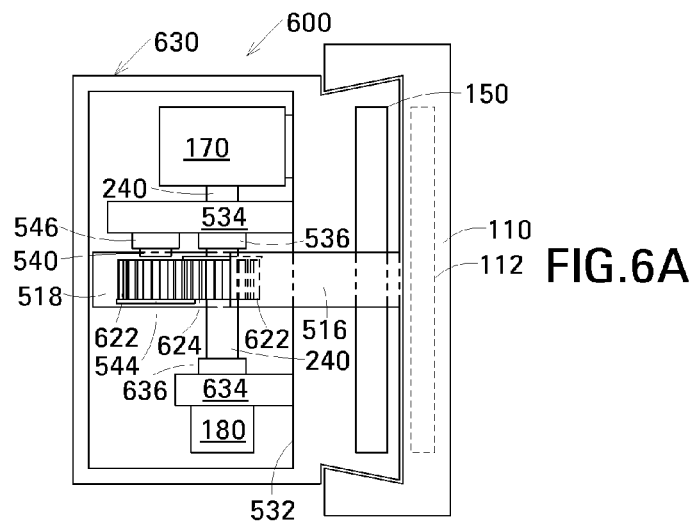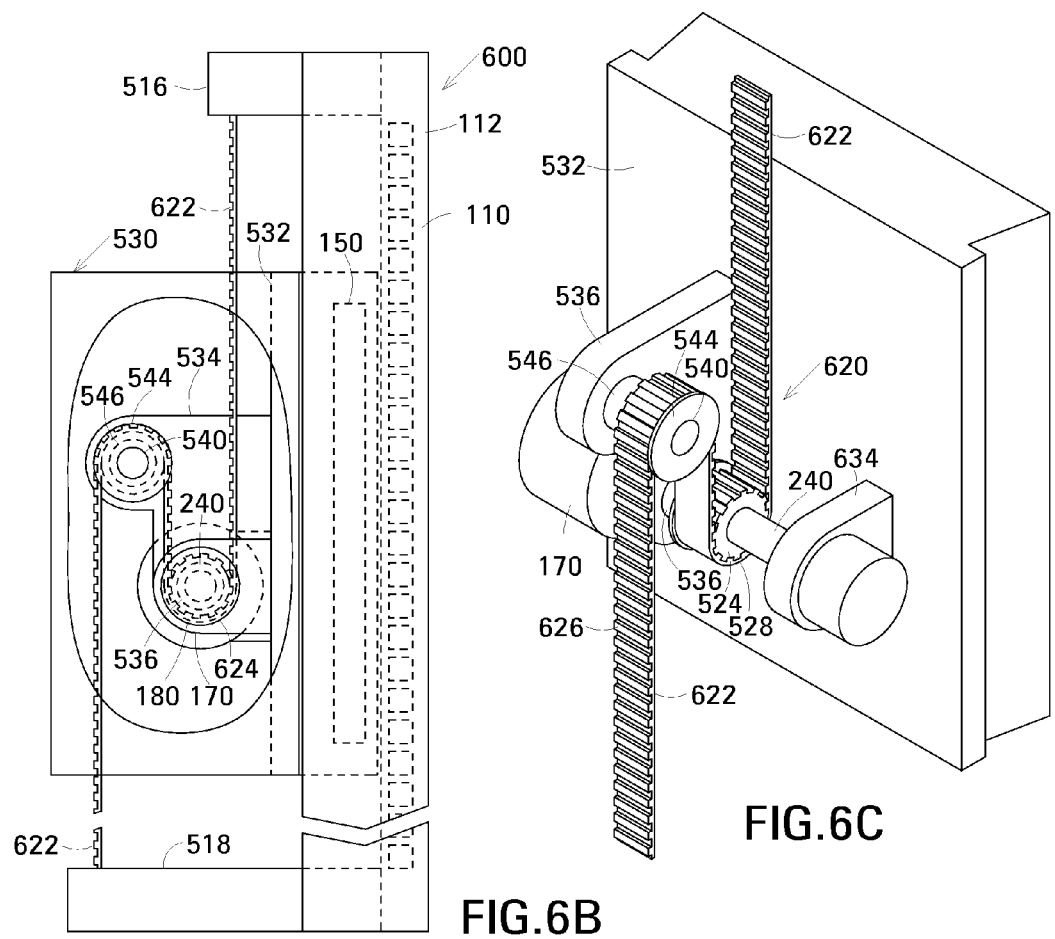

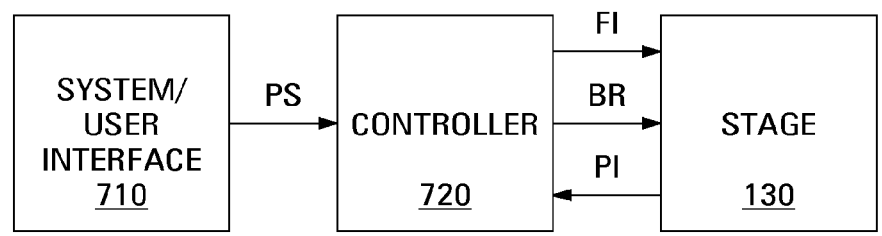
FIG.7A
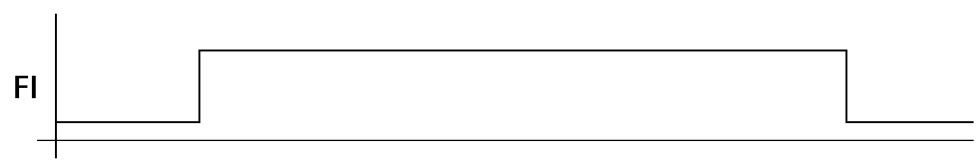
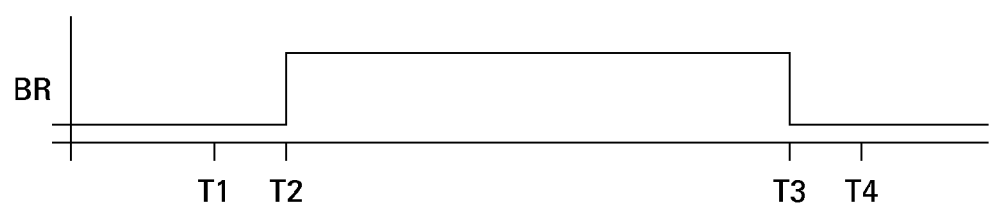
FIG.7B

AUTOMATIC SYSTEM BRAKE

BACKGROUND

Automated systems, such as robot systems, include various moving parts that are moved automatically. In an example, a portion of a robot is moved to perform various functions. To move a portion of an automated system, such as a robot, a motive force is typically applied by means of a motor, such as an electric motor. Whereas a moving portion of an automated system may be stopped simply by no longer applying the motive force, in some applications, it is desirable to retard the motion of the moving portion by means of a braking system.

Of particular interest is an automated system in which the movable portion moves in a vertical direction or in a direction having a significant vertical component. In many cases, no longer applying the motive force would undesirably allow the movable portion to fall.

Using a linear motor to provide the motive force to the movable portion is of interest. However, the possibility of the movable portion falling in the event of a power failure is especially problematic when a linear motor is used to provide the motive force because, unlike the braking provided by an unpowered conventional rotary electric motor and its drive mechanism, an unpowered linear motor provides substantially no braking.

BRIEF DESCRIPTION OF THE DRAWINGS

FIGS. 5A, 5B and 5C are respectively a top view, a side view, and a cut-away partial isometric view showing an example of a translation apparatus in accordance with another embodiment of the invention.

FIGS. 6A, 6B and 6C are respectively a top view, a side view, and a cut-away partial isometric view showing an example of a translation apparatus in accordance with yet another embodiment of the invention.

FIG. 7A is a block diagram showing an example of a system that can be used to control the motion of the stage.

FIG. 7B is a timing diagram showing an example of the relative timing of the force indication signal and the brake release signal generated by an example the system shown in FIG. 7A.

DETAILED DESCRIPTION

Figure 1A:
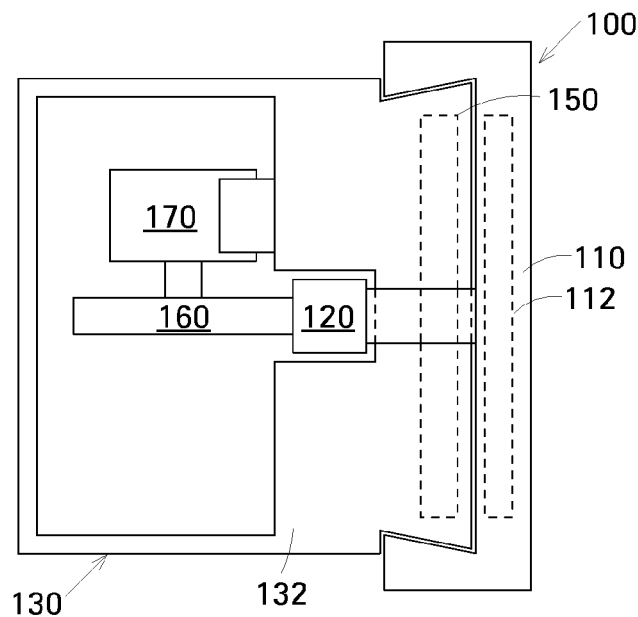
FIGS. 1A and 1B are respectively a top view and a side view showing an example of a translation apparatus in accordance with an embodiment of the invention.

An embodiment of the invention provides a translation apparatus suitable for use in such applications as robotic systems or other automated systems. The translation apparatus comprises an elongate track and an elongate fixed member. The fixed member extends parallel to the track in a fixed lengthwise position relative to the track. The translation apparatus additionally comprises a movable stage mounted on the track and capable of movement along the track. Typically, the stage is used to move a portion of a robot or an automated system along the track. The stage comprises a motive force generator, a rotatable member and a rotary brake. The motive force generator is operable to move the stage along the track. The rotatable member is coupled with the fixed member in a manner that converts motion of the stage along the track into rotation of the rotatable member. The rotary brake is selectively operable to apply a braking torque to the rotatable member. The coupling between the rotatable member and the fixed member converts the braking torque applied to the rotatable member into a braking force applied to the stage.

Another embodiment of the invention provides a stage movable in translation relative to an elongate fixed member. The stage comprises an armature, a motive force generator, a motive force generator a rotatable member, a rotary brake and a rotary encoder. The motive force generator is fixed to the armature and is operable to move the stage relative to the fixed member. The rotatable member is coupled with the fixed member in a manner that converts movement of the stage relative to the fixed member into rotation of the rotatable member. The rotary brake is fixed to the armature and has a default state in which the rotary brake applies a braking torque to the rotatable member. The coupling between the rotatable member and the fixed member converts the braking torque to a braking force applied to the stage. The rotary encoder is coupled to the rotatable member to quantify the rotation of the rotatable member.

The rotary brake can be regarded as having two braking states, namely, an active state in which the rotary brake provides a maximum braking torque and a released state in which the rotary brake provides substantially no braking torque. One of the braking states of the rotary brake is a default state. The default state is the braking state of the rotary brake absent any external stimulus. Applying an external stimulus to the rotary brake changes the braking state of rotary brake from the braking state corresponding to the default state to the other braking state. Although the default state of the rotary brake may be either of the above-mentioned braking states, a rotary brake embodiment in which the active state is the default state provides fail-safe braking. With such a default state, a power failure or a failure of the controller that controls the operation of the rotary brake will cause the rotary brake to apply its maximum braking torque. Such braking torque, when converted by the coupling between the rotatable member and the fixed member to a braking force applied to the stage, will retard the movement of the stage along the track and hold the stage in place until power is restored or the fault is remedied. In an embodiment of the translation apparatus in which the track is vertically mounted or is oriented in a direction having a significant vertical component, a fail-safe embodiment of the rotary brake whose default braking state is the active braking state in which the rotary brake provides its maximum braking torque will automatically prevent the stage, and any item attached to the stage, from falling in the event of a power failure or other failure. An embodiment of the translation apparatus in which the track is oriented substantially horizontally and holding the stage in position relative to the track in the event of a power or other failure is regarded as being necessary can incorporate a non-fail-safe embodiment of the rotary brake.

In some embodiments, the stage additionally comprises a rotary encoder rotationally coupled to the rotatable member. The coupling between the rotatable member and the fixed member translates the linear motion of the stage along the track into rotation of the rotatable member. The rotation of the rotatable member is in turn coupled to the rotary encoder. The rotary encoder provides electrical signals that directly represent the magnitude and direction of the displacement of the stage from a reference position or that can be processed to determine such displacement. A displacement signal provided by or derived from such electrical signals can be used as a feedback signal for a controller that automatically controls the movement of the stage. Using a rotary encoder instead of a more conventional linear position or displacement encoder allows the same rotary encoder to be used regardless of the length of the track. A linear position or displacement encoder uses a code track specific to the length of the track. Moreover, a rotary encoder is typically less expensive than a linear encoder.

Figure 1B:
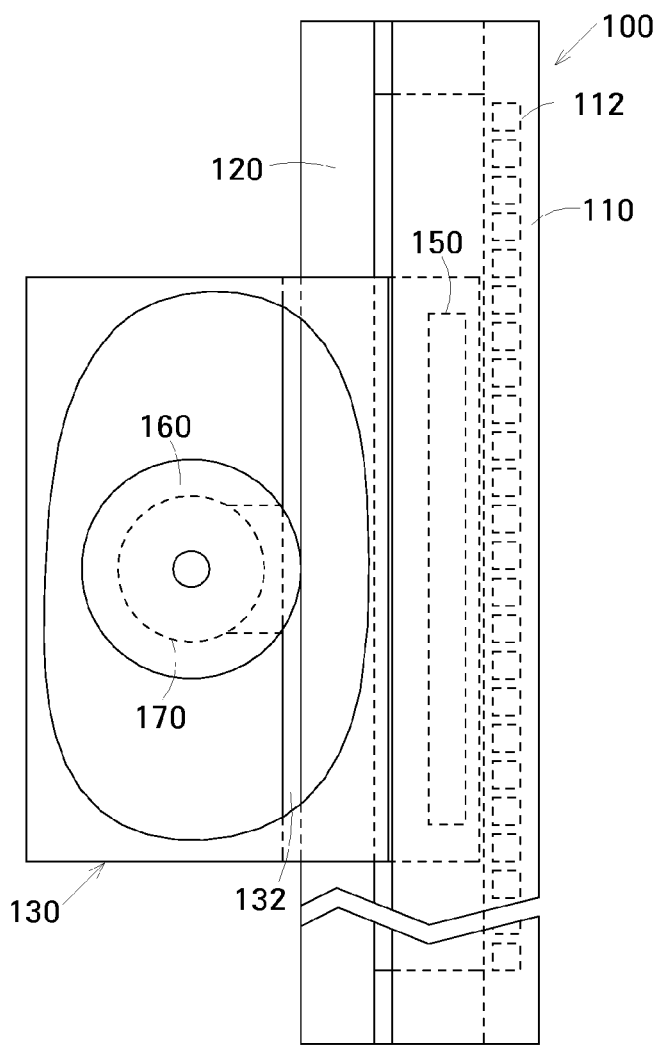

FIGS. 1A and 1B are respectively a top view and a side view showing an example of a translation apparatus 100 in accordance with an embodiment of the invention. The example of translation apparatus 100 shown is composed of an elongate track 110, an elongate fixed member 120 extending parallel to track 110 and a stage 130 mounted on track 110. Fixed member 120 is located in a fixed lengthwise position relative to track 110. Stage 130 is mounted on track 110 in a manner that allows the stage to move along the track.

Stage 130 is composed of a motive force generator 150, a rotatable member 160 and a rotary brake 170. Motive force generator 150, rotatable member 160 and rotary brake 170 are mounted on an armature 132. Rotatable member 160 is coupled to fixed member 120 in a manner that converts the movement of stage 130 along track 110 into rotation of rotatable member 160. As will be described in more detail below with reference to FIGS. 2A, 2B, 3A and 3B, rotary brake 170 is composed of a fixed portion and a rotatable portion. The fixed portion of rotary brake 170 is fixed to armature 132. Rotary brake 170 is coupled to rotatable member 160 in such a manner that rotation of rotatable member 160 rotates the rotatable portion of rotary brake 170. Rotary brake 170 is selectively operable to apply a braking torque to rotatable member 160. The coupling between rotatable member 160 and fixed member 120 converts the braking torque applied to rotatable member 160 by rotary brake 170 into a braking force applied to stage 130.

In the example shown, track 110 is a vertically-oriented straight track. Track 110 may alternatively be oriented at a non-zero angle, including an angle of 90°, relative to the vertical. Other configurations of track 110 are possible. For example, track 110 can be curved over at least part of its length, or can have another configuration that is not straight over at least part of its length. In one example, track 110 is circular or oval.

In the example shown, stage 130 is slidably mounted on track 110 so that stage 130 can move to and fro along track 110 in response to a motive force supplied by motive force generator 150. Wheels, rollers or some other bearing mechanism may alternatively be used to mount stage 130 on track 110. The configuration of track 110 shown herein and the manner in which stage 130 is mounted on track 110 shown herein are merely examples. Many other configurations of track 110 are possible and can be used. Stage 130 can be mounted on track 110 in many other ways and such ways can be used.

In the example shown, motive force generator 150 is composed of the rotor of a linear motor. The stator of the linear motor is composed of stator segments arrayed along the length of track 110. An exemplary stator segment is shown at 112. Permanent magnets or electromagnets can be used as the stator segments. A pattern of electric currents fed to motive force generator 150 generates a magnetic field that interacts with the magnetic field generated by the stator segments to generate a motive force that is applied to stage 130 in a direction having a component oriented along track 110. In this disclosure, the term rotor is used to denote the moving portion of a linear motor notwithstanding the fact that the moving portion moves in translation rather than in rotation. Linear electric motors suitable for use in apparatus 110 are known in the art and will therefore not be described in greater detail here.

In another example, motive force generator 150 is composed of a conventional rotary electric motor (not shown) coupled to drive a drive mechanism (not shown) that applies a motive force between stage 130 and track 110 in a direction parallel to track 110. Rotary electric motors and drive mechanisms suitable for used in apparatus 110 are known in the art and will therefore not be described in greater detail here. Other types of motor or motor component suitable for use as motive force generator 150 are known in the art and may be used.

Translation apparatus 100 may include additional items not shown. In an example, translation apparatus additionally includes at least one cable that provides either or both of power and control signals to stage 130 from sources external to the portion of translation apparatus 100 shown. In an example, such cable extends to stage 130 through a flexible chain system or a wire guide. Within stage 130, such cable can be connected to a power/control module (not shown, but described below with reference to FIG. 7A) that provides power and control signal connections to motive force generator 150, rotary brake 170, optionally, a rotary encoder, and items (not shown) attached to stage 130.

In an automated system, translation apparatus 100 is used to move an item or various items attached to stage 130 in the direction defined by track 110. In an example, a robotic element or tool is attached to stage 130. Thus, stage 130 typically includes one or more attachment points (not shown) to which one or more items, such as tools or robotic elements, can be attached to stage 130.

Translation apparatus 100 translates stage 130 relative to a surrounding system. Motive force generator 150 creates a motive force that moves stage 130 along track 110. The resulting movement of stage 130 causes rotatable member 160 to rotate since fixed member 120 is fixed relative to track 110 and rotatable member 160 is coupled to fixed member 120 in a manner that converts the movement of the stage into rotation of the rotatable member. The resulting rotation of rotatable member 160 rotates the rotatable portion of rotary brake 170. To retard the linear motion of stage 130 along track 110, rotary brake 170 is used to apply a braking torque to rotatable member 160. The coupling between rotatable member 160 and fixed member 120 converts the braking torque to a braking force applied to stage 130.

Figure 2A:
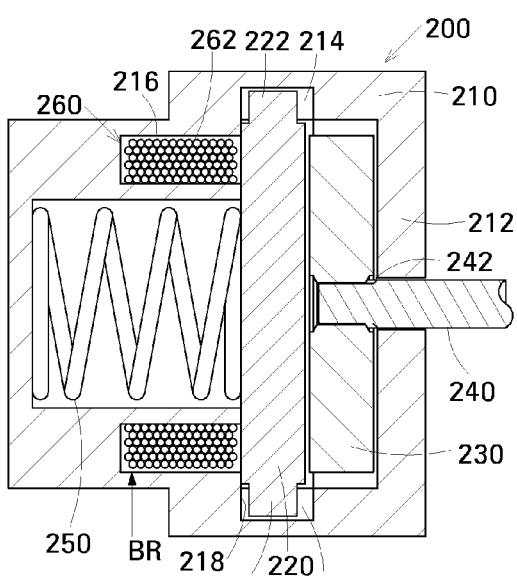
FIGS. 2A and 2B are partial cross sectional views showing a first example of a rotary brake in its activated and default states.
Figure 2B:
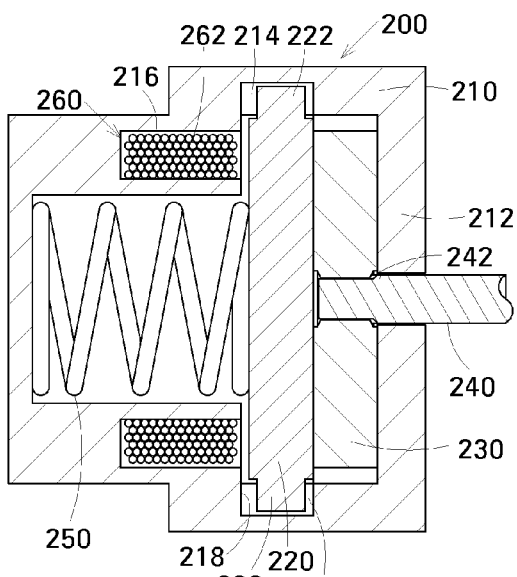

FIGS. 2A and 2B are cross-sectional views showing an example 200 of an embodiment of rotary brake 170 (FIGS. 1A, 1B) having a fail-safe configuration. A spring holds rotary brake 200 in its default state, i.e., in its active state in which the rotary brake applies a braking torque to an input shaft. FIG. 2A shows rotary brake 200 is in its non-default state, i.e., in its released state in which it applies substantially no braking torque to the input shaft, and FIG. 2B shows rotary brake 200 in its default state in which it applies a braking torque to the input shaft. Rotary brake 200 is set to its released state by applying a suitable stimulus to the rotary brake. In the example shown, the stimulus is a signal that will be referred to as a brake release signal BR. Brake release BR signal is typically an electrical signal, but another type of signal, such as an optical signal, a mechanical signal, a pneumatic signal, or a hydraulic signal, can be used as brake release signal BR.

Rotary brake 200 is composed of a housing 210, a fixed plate 212, a movable plate 220, a driven plate 230, an input shaft 240, a biasing spring 250 and an actuator 260. In the example shown, fixed plate 212 is part of housing 210. Movable plate 220 and driven plate 230 are located within housing 210 with driven plate sandwiched between fixed plate 212 and movable plate 220. Driven plate 230 and input shaft 240 constitute the rotatable portion of rotary brake 200. Input shaft 240 has a longitudinal axis that defines an axial direction of rotary brake 200. In an embodiment of translation apparatus 100 described above with reference to FIGS. 1A and 1B incorporating an embodiment of rotary brake 200, rotatable member 160 is mounted on input shaft 240 such that rotation of rotatable element 160 rotates input shaft 240 and rotary brake 200 applies a braking torque to rotatable element 160 via input shaft 240.

Extensions 222 extending from movable plate 220 and engaging with recesses 214 defined in housing 210 allow movable plate 220 to move axially relative to housing 210 but prevent movable plate 220 from rotating about an axis defined by input shaft 240.

Driven plate 230 is mounted on one end of input shaft 240 by splines 242 that couple the rotary motion of input shaft 240 to driven plate 230 while allowing driven plate 230 to move axially in response to axial movement of fixed plate 220.

Spring 250 is located within housing 210 between movable plate 220 and an internal surface of housing 210 opposite fixed plate 212. Spring 250 applies an axial force between housing 210 and movable plate 220.

Actuator 260 is located within housing 210. In the example shown, movable plate 220 is made of a ferromagnetic material, and actuator 260 is composed of a solenoid 262 located in an annular recess 216 defined in housing 210.

In the default state of rotary brake 200 shown in FIG. 2B, the axial force applied to movable plate 220 by spring 250 moves movable plate 220 towards fixed plate 212 so that movable plate 220 and fixed plate 212 clamp driven plate 230 between them. Friction resulting from the axial clamping force applied to driven plate 230 by spring 250, fixed plate 212 and movable plate 220 applies a braking torque to driven plate 230. The braking torque impedes the rotation of driven plate 230, and, hence, that of input shaft 240. The one or both of the opposed surfaces of driven plate 230 and fixed plate 212 and fixed plate 212 and movable plate 220 may be coated with friction material (not shown) to increase the braking torque applied to input shaft 240 for a given axial force applied to movable plate 220 by spring 250. In the example shown, spring 250 is a compression coil spring. Another suitable type of spring may alternatively be used.

In the released state of rotary brake 200 shown in FIG. 2A, brake release signal BR has been provided to actuator 260. In response to brake release signal BR, coil 262 generates a magnetic field that attracts movable plate 220 towards it so that movable plate 220 moves to the left until it contacts the inside surface 218 of housing 210. Movable plate 220 moving to the left compresses spring 250 and relieves the clamping pressure on driven plate 230. Relieved of such pressure, driven plate 230 moves to the left, clear of fixed plate 212. Free of fixed plate 212 and movable plate 220, driven plate 220 and, hence, input shaft 240, are free to rotate.

Discontinuing brake release signal BR provided to actuator 260, either deliberately or due to a controller failure or power supply failure, causes rotary brake 200 to revert to its default state shown in FIG. 2B. In its default state, rotary brake 200 applies a braking torque to input shaft 240. Without brake release signal BR, actuator 260 can no longer hold movable plate 220 in contact with the inside surface 218 of housing 210 against the axial force applied by spring 250 in its compressed state. Consequently, spring 250 moves movable plate 220 to the right so that fixed plate 212 and movable plate 212 clamp driven plate 230 between them, as shown in FIG. 2B. Friction resulting from the axial clamping force applied to driven plate 230 by spring 250, fixed plate 212 and movable plate 220 one more applies the braking torque to driven plate 230. The braking torque impedes the rotation of driven plate 230 and, hence, input shaft 240.

Figure 3A:
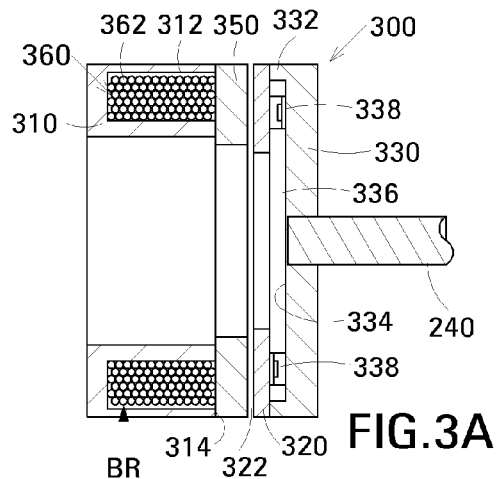
FIGS. 3A and 3B are partial cross sectional views showing a second example of a rotary brake in its activated and default states.
Figure 3B:
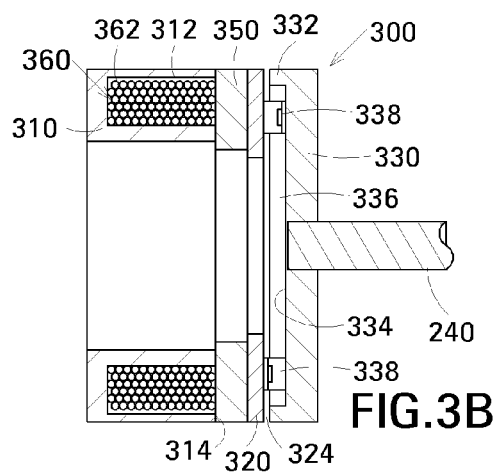

FIGS. 3A and 3B are cross-sectional views of another example 300 of an embodiment of rotary brake 170 (FIGS. 1A, 1B) having a fail-safe configuration. A permanent magnet holds rotary brake 300 in its default state, i.e., its active state in which the rotary brake applies a braking torque to input shaft 240. FIG. 3A shows rotary brake 300 in its non-default state, i.e., its released state in which it applies no braking torque to input shaft 240, and FIG. 3B shows rotary brake 300 in its default state in which it applies a braking torque to the input shaft.

Rotary brake 300 is composed of a solenoid housing 310, a pole piece 320, a pole piece carrier 330, input shaft 240, a permanent magnet 350 and an actuator 360. Input shaft 240, pole piece 320 and pole piece carrier 330 constitute the rotatable portion of rotary brake 300. Input shaft 240 has a longitudinal axis that defines an axial direction of rotary brake 300. In an embodiment of translation apparatus 100 described above with reference to FIGS. 1A and 1B incorporating an embodiment of rotary brake 300, rotatable member 160 is mounted on input shaft 240 such that rotation of rotatable element 160 rotates input shaft 240 and rotary brake 300 applies a braking torque to rotatable element 160 via input shaft 240.

In the example shown, solenoid housing 310 is substantially cylindrical, and actuator 360 is composed of a solenoid 362 located in an annular recess 312 defined in solenoid housing 310 adjacent an end surface 312. Permanent magnet 350 is annular and is affixed to the end surface 314 of solenoid housing 310.

Pole piece carrier 330 is substantially circular and is approximately equal in diameter to permanent magnet 350. Pole piece carrier 330 is mounted on one end of input shaft 240 concentric therewith. Pole piece carrier 330 has a circular major surface 334 facing away from input shaft 240. A circular lip 332 located at the perimeter of major surface 334 extends axially away from input shaft 240 to define a recessed region 336. Pole piece 320 is an annular piece of ferromagnetic material approximately equal in diameter to pole piece carrier 330. Flexures 338 circumferentially offset from one another within recessed region 336 mount pole piece 320 on pole piece carrier 330 in a concentric relationship. In some embodiments, the flexures constitute respective parts of a single diaphragm spring. Opposite ends of each flexure are affixed to pole piece 320 and pole piece carrier 330, respectively. Flexures 338 allow pole piece 320 to move axially relative to pole piece carrier 330. Attaching pole piece 320 to pole piece carrier 330 by flexures 338 subjects the flexures to a stress that applies an axial force between the pole piece and the pole piece carrier. The axial force biases pole piece 320 into contact with the lip 332 of pole piece carrier 330. In rotary brake 300, pole piece 320 is disposed opposite permanent magnet 350 in a concentric relationship. The axial position of input shaft 240, or the axial position of pole piece carrier 330 on input shaft 240, is set such that, with pole piece 320 in contact with the lip 332 of pole piece carrier 330, pole piece 320 is separated from permanent magnet 350 by a narrow gap 322. The width of gap 322 is within the range of axial motion of pole piece 320 relative to pole piece carrier 330.

In the default state of rotary brake 300 shown in FIG. 3B, permanent magnet 350 applies an axial force to pole piece 320. The axial force causes pole piece 320 to move to the left until it contacts permanent magnet 350, such axial movement being allowed by flexures 338. While it is in contact with permanent magnet 350, pole piece 320 is separated from the lip 332 of pole piece carrier 330 by a gap 324. Friction resulting from pole piece 320 contacting permanent magnet 350 in response to the axial force applied to pole piece 320 by permanent magnet 350 provides a braking torque that impedes the rotation of pole piece 320, and, hence, pole piece carrier 330 and input shaft 340.

In the released state of rotary brake 300 shown in FIG. 3A, brake release signal BR has been provided to actuator 360. In response to brake release signal BR, solenoid 362 of actuator 360 generates a magnetic field that opposes the magnetic field applied to pole piece 320 by permanent magnet 350. The resulting magnetic field applied to pole piece 320 is of insufficient strength to overcome the axial force applied to pole piece 320 by flexures 338. The flexures move pole piece 320 to the right into contact with the lip 332 of pole piece carrier 330 and out of contact with permanent magnet 350. With no contact between pole piece 320 and permanent magnet 350, pole piece 320 and, hence, pole piece carrier 330 and input shaft 240, are free to rotate.

Above-described rotary brakes 200 and 300 are merely examples of fail-safe rotary brakes that can be used as rotary brake 170. Rotary brakes similar in structure to rotary brakes 200 and 330 but having a release state as default state can be used as rotary brake 170 in applications in which braking does not have to be provided in the event of a power or other failure, as described above. Other types of rotary brake, including rotary brakes based on rotating disks, and rotary brakes based on rotating drums with either internal shoes or external bands, are known in the art and may be used as rotary brake 170. Other sources of mechanical force may be used to bias rotary brake 170 into its default state in which it applies a braking torque to the input shaft, and other forms of actuation, such as pneumatic actuation or hydraulic actuation, may be used to actuate rotary brake 170. Moreover, while rotatable member 160 and driven plate 230 are described above as separate elements coupled to one another by input shaft 240, driven plate 230 and rotatable member 160 may alternatively constitute a single element mounted on a shaft similar to input shaft 240. Similarly, while rotatable member 160 and pole piece carrier 330 are described above as separate elements coupled to one another by input shaft 240, pole piece carrier 330 and rotatable member 160 may alternatively constitute a single element mounted on a shaft similar to input shaft 240. Rotary brakes suitable for use in the various translation apparatus embodiments described herein are commercially available from such suppliers as Electroid (www.electroid.com); Stromag, Inc., Centerville, Ohio; Ogura Industrial Corp., Somerset, N.J.; and Nexen Group, Inc., Vandais Heights, Minn.

Although rotary brake 170 has been described above as having a fail-safe configuration in which it applies a braking torque in the event of a power failure or controller failure, in some applications, rotary brake 170 may additionally be used to retard the linear motion of stage 130 along track 110 during routine operations of translation apparatus 100. Motive force generator 150 is powered to generate a motive force that will move stage 130 along track 110, and brake release signal BR is supplied to rotary brake 170. The brake release signal causes rotary brake 170 no longer to provide a braking torque, and stage 130 is then free to move along track 110. As stage 130 approaches its planned destination, motive force generator 150 is operated to generate a braking force that progressively slows the motion of the stage along the track. At the planned destination, brake release signal BR is discontinued, and rotary brake 170 once more provides a braking torque that is converted by rotatable member 160 and fixed member 120 to a braking force applied to stage 130 to bring the stage to a full stop. Rotary brake 170 then holds stage 130 in place while items attached to the stage perform one or more operations. Typically, the operations are operations that, absent the braking supplied by rotary brake 170, could cause undesired movement of stage 130 relative to track 110.

Figure 4:
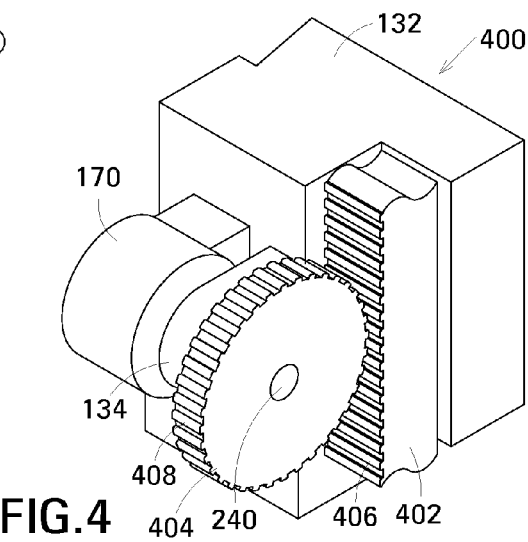
FIG. 4 is a cut-away partial isometric view, showing an example of a combination of a fixed member and rotatable member.

FIG. 4 is a cut-away partial isometric view showing an example of a combination 400 of fixed member 120 and rotatable member 160 shown in FIGS. 1A, 1B. Referring additionally to FIGS. 1A, 1B, in combination 400, fixed member 120 is configured as a toothed rack 402 and rotatable member 160 is configured as a toothed wheel 404 having teeth configured to engage with the teeth of rack 402. An exemplary one of the teeth of rack 402 is indicated at 406 and an exemplary one of the teeth of toothed wheel 404 is indicated at 408. Reference numeral 406 will additionally be used to refer to the teeth of rack 402 and reference numeral 408 will additionally be used to refer to the teeth of toothed wheel 404.

Rack 402 is directly or indirectly fixed to track 110 at least at its ends, and is typically additionally supported at intermediate points along its length. Rack 402 is rigid both in its longitudinal direction and in lateral directions orthogonal thereto. Toothed wheel 404 is mounted on the input shaft 240 of rotary brake 170. In the example shown, input shaft 240 passes through a bearing (not shown) that constitutes part of a bracket 134 mounted on the armature 132 of stage 130 between toothed wheel 404 and rotary brake 170. In an embodiment, rack 402 is composed of a toothless rail (not shown) and a chain (not shown) disposed along the rail and fixed to the rail at its ends and, optionally, at intermediate points along its length. The chain provides the teeth of rack. In this case, the teeth of toothed wheel 404 are shaped to engage with the chain. In another embodiment, a roller pinion system such as that sold by Nexen Group, Inc. is used as rack 402 and toothed wheel 404.

Engagement between one or more of the teeth 408 of toothed wheel 404 with one or more of the teeth 406 of rack 402 positively couples the toothed wheel with the rack such that the possibility of slippage between the toothed wheel and the rack is eliminated absent a component failure. The positive coupling of toothed wheel 404 and rack 402 converts the braking torque applied to toothed wheel 404 by rotary brake 170 into the braking force that retards the motion of stage 130 along track 110. The positive coupling between toothed wheel 404 and rack 402 is obtained with a relatively low force applied between stage 130 and track 110 in a direction orthogonal to the length of track 110. The force only has to be sufficient to ensure that the teeth 408 of toothed wheel 404 remain engaged with the teeth 406 of rack 402.

As stage 130 moves linearly along track 110, the above-described positive coupling between rack 402 and toothed wheel 404 converts the linear motion of stage 130 to rotation of toothed wheel 404, input shaft 240 and the rotatable portion of rotary brake 170. Moreover, the braking torque applied by rotary brake 170 is conveyed by input shaft 240 to toothed wheel 404. The coupling between the teeth 408 of toothed wheel 404 and the teeth 406 of rack 402 converts the braking torque applied by rotary brake 170 to toothed wheel 404 to a braking force applied by toothed wheel 404 to rack 402. The braking force retards the motion of stage 130 along track 110. As noted above, in typical embodiments, rotary brake 170 is configured such that it applies the braking torque automatically in the event of a failure, such as a power failure. With such an embodiment of rotary brake 170, the automatic application of the braking torque holds stage 130 in position on track 110 in the event of such failure. In embodiments in which track is vertically oriented, or has an orientation having a significant vertical component, the automatic application of the braking torque prevents stage 130 and items attached to the stage from falling down along track 110.

FIGS. 5A, 5B and 5C are respectively a top view, a side view, and a cut-away partial isometric view showing an example of a translation apparatus 500 in accordance with another embodiment of the invention. Elements of translation apparatus 500 that correspond to elements of translation apparatus 100 described above with reference to FIGS. 1A, 1B are indicated using the same reference numerals and will not be described again here. The example of translation apparatus 500 shown is composed of elongate track 110, a stage 530 slidably mounted on track 110 so that the stage is capable of movement along the track, and an example of a combination 520 of fixed member 120 and rotatable member 160 described above with reference to FIGS. 1A, 1B.

Referring additionally to FIGS. 1A, 1B, in combination 520, fixed member 120 is configured as a ribbon 522 and rotatable member 160 is configured as a pulley 524. Ribbon 522 is directly or indirectly fixed to track 110 at its opposite ends. Connection points for the ends of ribbon 522 are shown schematically at 516 and 518. Ribbon 522 is relatively inelastic with respect to tension applied between its ends but is flexible in at least one lateral direction orthogonal to its length to allow ribbon 522 to wrap around pulley 524. The maximum allowed elongation of ribbon 522 is determined by the length of ribbon 522 and the maximum distance stage 530 is allowed to travel with rotary brake 170 in its default state in which it applies a braking torque to pulley 524.

Pulley 524 is mounted on the input shaft 240 of rotary brake 170. In the example shown, input shaft 240 is supported by a bearing 536 carried by a bracket 534 mounted on the armature 532 of stage 530 between pulley 524 and rotary brake 170. An idler pulley 544 is mounted on stage 530 offset from pulley 524 in a direction corresponding to the length direction of track 110 when the stage is mounted on the track. In the example shown, idler pulley 544 is mounted on a shaft 540 that is supported by a bearing 546 also carried by bracket 534.

Starting from connection point 516, ribbon 522 extends parallel to track 110 towards pulley 524, wraps approximately half-way round pulley 524, extends in the opposite direction parallel to track 110 towards idler pulley 544, wraps approximately half-way round idler pulley 544 and then extends parallel to the track towards connection point 518. Idler pulley 544 serves to increase the wrap angle with which ribbon 522 wraps around pulley 524. An increased wrap angle increases the frictional force that a given tension applied to ribbon 522 can apply to pulley 524 and, hence, the maximum braking torque provided by rotary brake 170 that can be converted into a braking force applied to stage 530. Ribbon 522 is tensioned by moving connection points 516 and 518 apart, or by moving idler pulley 544 apart from pulley 524. The tensioning may be static tensioning in which the connection point or pulley that is moved to establish the tension is locked in position to maintain the tension. Alternatively, the tensioning is maintained dynamically by a spring or other suitable tensioner, for example.

Either or both of the mating surfaces of ribbon 522 and pulley 524 may be coated with friction material to increase the braking force that pulley 524 can apply to ribbon 522 for a given tension applied to the ribbon. In one example, ribbon 522 has a core of elongate fibers inside a rubber sleeve that provides the mating surface with pulley 524. In another example, ribbon 522 is a steel ribbon and the surface of pulley 524 that contacts ribbon 522 is rubber. In yet another example, ribbon 522 and pulley 524 are toothed to provide positive coupling between them in a manner similar to that described below with reference to FIGS. 6A-6C. With pulley 524 and idler puller 524 appropriately configured, a rope, a V-belt or a chain may be used as ribbon 522.

The tension applied to ribbon 522 applies a radial force to pulley 524. Friction resulting from the radial force applied by the ribbon to the pulley couples the pulley and the ribbon. The tension applied to ribbon 522 is such that the radial force has a magnitude sufficient to prevent slippage between pulley 524 and ribbon 522 when rotary brake 170 applies its braking torque to the pulley. That way, coupling between pulley 524 and ribbon 522 converts the braking torque generated by rotary brake 170 to a braking force that retards the motion of stage 530 along track 110.

As stage 530 moves linearly along track 110, the above-described coupling between ribbon 522 and pulley 524 converts the linear motion of stage 130 to rotation of pulley 524, input shaft 240 and the rotatable portion of rotary brake 170. Moreover, the braking torque provided by rotary brake 170 is conveyed by input shaft 240 to pulley 524. The coupling between pulley 524 and ribbon 522 converts the braking torque applied to pulley 524 by rotary brake 170 to a braking force applied by pulley 524 to ribbon 522. The braking force retards the motion of stage 530 along track 110. As noted above, in typical embodiments, rotary brake 170 is configured such that it applies braking automatically in the event of a failure, such as a power failure. With such an embodiment of rotary brake 170, the automatic application of braking holds stage 530 in position on track 110 in the event of such failure. In embodiments in which track 110 is vertically oriented, or has an orientation having a significant vertical component, the automatic application of braking prevents stage 530 and items attached to the stage from falling down along track 110.

The size of pulley 524 is selected in accordance with the intended application. Typically, an embodiment of pulley 524 having a minimum possible radius is selected to maximize the ratio between the linear braking force applied to stage 530 and the braking torque generated by rotary brake 170. However, the minimum possible radius of pulley 530 is limited by the minimum radius of curvature specified for ribbon 522. Pulley 524 is selected to have the smallest possible radius that will not damage ribbon 522 in normal use. In an example, the radius of pulley 524 is selected such that pulley 524 does not cause ribbon 522 to bend with a radius of curvature less than that specified for normal use of ribbon 522. Idler pulley 544 can have a radius of curvature larger than that of pulley 524 to reduce the bending stress on ribbon 522.

In an alternative arrangement of translation apparatus 500, the braking force that can be applied to stage 530 by a rotary brake providing a given braking torque and a given diameter of pulley 524 is increased by rotationally coupling an additional rotary brake to idler pulley 544 in addition to rotary brake 170 rotationally coupled to pulley 524.

FIGS. 6A, 6B and 6C are respectively a top view, a side view, and a cut-away partial isometric view showing an example of a translation apparatus 600 in accordance with another embodiment of the invention. Elements of translation apparatus 600 that correspond to elements of translation apparatus 100 described above with reference to FIGS. 1A, 1B and translation apparatus 500 described above with reference to FIGS. 5A-5C are indicated using the same reference numerals and will not be described again here. The example of translation apparatus 600 shown is composed of elongate track 110, stage 530 slidably mounted on track 110 so that the stage is capable of movement along the track, a rotary encoder 180, and an example of a combination 620 of fixed member 120 and rotatable member 160 described above with reference to FIGS. 1A, 1B.

Referring additionally to FIGS. 1A, 1B, in combination 620, fixed member 120 is configured as a toothed ribbon 622 and rotatable member 160 is configured as a toothed pulley 624 having teeth configured to engage with the teeth of toothed ribbon 622. An exemplary one of the teeth of toothed ribbon 622 is indicated at 626 and an exemplary one of the teeth of toothed pulley 624 is indicated at 628. Reference numeral 626 will additionally be used to refer to the teeth of toothed ribbon 622 and reference numeral 628 will additionally be used to refer to the teeth of toothed pulley 624.

Toothed ribbon 622 is directly or indirectly fixed to track 110 at its opposite ends. Connection points for the ends of toothed ribbon 622 are shown schematically at 516 and 518. Toothed ribbon 622 is relatively inelastic with respect to tension applied between its ends, but is flexible in at least one lateral direction orthogonal to its length to allow toothed ribbon 622 to wrap around pulley 624. The maximum allowed elongation of toothed ribbon 622 is determined by the length of toothed ribbon 622 and the maximum distance stage 630 is allowed to travel with rotary brake 170 in its default state in which it applies a braking torque to pulley 624.

Toothed pulley 624 is mounted on the input shaft 240 of rotary brake 170. In the example shown, input shaft 240 is supported by bearing 536 carried by bracket 534 mounted on the armature 532 of stage 530 between toothed pulley 624 and rotary brake 170. Idler pulley 544 is mounted on stage 530 offset from toothed pulley 624 in a direction corresponding to the length direction of track 110 when the stage is mounted on the track. Idler pulley 544 serves to increase the wrap angle with which toothed ribbon 622 wraps around toothed pulley 624. The increased wrap angle increases the number of the teeth 626 of toothed ribbon 622 that engage with ones of the teeth 628 of toothed pulley 624. The routing of toothed ribbon 622 is that same as that of ribbon 522 described above with reference to FIGS. 5A-5C and will not be described again here. Toothed ribbon 622 is tensioned in a manner similar to that of ribbon 522 and the tensioning of toothed ribbon 622 will not be described again here.

Engagement between one or more of the teeth 628 of toothed pulley 624 and one or more of the teeth 626 of toothed ribbon 622 positively couples the toothed pulley with the toothed ribbon such that the possibility of slippage between the toothed pulley and the toothed ribbon is eliminated absent a component failure. The positive coupling between toothed pulley 624 and toothed ribbon 622 converts the braking torque applied to toothed pulley 624 by rotary brake 170 into the braking force that retards the motion of stage 630 along track 110. The positive coupling between toothed pulley 624 and toothed ribbon 622 is obtained with a lower tension applied to toothed ribbon 622 than in an embodiment, such at that described above with reference to FIGS. 5A-5C, that relies on friction to provide the coupling between the pulley and the ribbon. The tension only has to be sufficient to ensure that the teeth 626 of toothed ribbon 622 remain engaged with the teeth 628 of toothed pulley 624.

Rotary encoder 180 is composed of a fixed portion and a rotatable portion that are not separately shown to simplify the drawing. Rotary encoder 180 is coupled to toothed pulley 624 in such a manner that the rotation of toothed pulley 624 in response to the motion of stage 530 along track 110 rotates the rotatable portion of the rotary encoder. In the example shown, the input shaft 240 of rotary brake 170 extends beyond toothed pulley 624 to engage with the rotatable portion of rotary encoder 180. Input shaft 240 is additionally supported by a bearing 636 carried by a bracket 634 mounted on the armature 532 of stage 530 between toothed pulley 624 and rotary encoder 180. Bracket 634 additionally supports rotary encoder 180. In another example, the rotatable portion of rotary encoder 180 is coupled directly to toothed pulley 624 and the fixed portion of the rotary encoder is mounted on armature 532.

As stage 530 moves linearly along track 110, the above-described positive coupling between toothed ribbon 622 and toothed pulley 624 converts the linear motion of stage 530 to rotation of toothed pulley 624, input shaft 240, the rotatable portion of rotary brake 170 and the rotatable portion of rotary encoder 180. In response to the rotation of its rotatable portion, rotary encoder 180 generates two electrical signals and outputs such signals to a controller (not shown, but see FIG. 7A) that constitutes part of stage 530 or is external to stage 530. From the electrical signals, the controller determines a magnitude and a direction of a change in the position of stage 530 along track 110. In one example, the electrical signals differ in phase but are otherwise nominally identical. The controller determines the magnitude of the change in position from either of the electrical signals and determines the direction of the change in position from the sign of the phase difference between the electrical signals. In another example, one of the electrical signals represents the magnitude of the change in position and the other of the electrical signals is a binary signal that represents the direction of the change in position. By initially moving the stage to a known position, such as one of the ends of track 110, the position of the stage along the track can be determined from the change in position represented by the electrical signals. The lack of slippage between toothed pulley 624 and toothed ribbon 622 allows a position signal derived from the electrical signals generated by rotary encoder 180 to provide an accurate quantification of the position of stage 530 along track 110. A similarly accurate quantification of the position of stage 530 can be obtained in an embodiment of translation apparatus 630 in which toothed wheel 404 and rack 402 described above with reference to FIG. 4 are substituted for toothed pulley 624 and toothed ribbon 622, respectively.

Since the position of stage 530 along track 110 is determined by processing operations performed by a controller in response to electrical signals generated by rotary encoder 180 instead of in response to electrical signals generated by a more customary linear encoder, no hardware changes to stage 530 are needed to allow stage 530 to be used with embodiments of track 110 of different lengths. Moreover, a rotary encoder is substantially less expensive than a linear encoder of equivalent performance, and does not require that linear encoding scales of different lengths be obtained and kept in inventory to allow embodiments of translation apparatus 600 to be made with different lengths of track 110. Finally, the incremental cost of incorporating a rotary encoder into translation apparatus 600 is minimal because the hardware needed to convert the linear motion of stage 530 to the rotary motion needed for input to the rotary encoder is already present in stage 530 as part of the braking system thereof.

The braking torque generated by rotary brake 170 is conveyed by input shaft 240 to toothed pulley 624. The above-described positive coupling between the teeth 626 of toothed ribbon 622 and the teeth 628 of toothed pulley 624 converts the braking torque applied to toothed pulley 624 by rotary brake 170 to a braking force applied by toothed pulley 624 to toothed ribbon 622. The braking force retards the motion of stage 530 along track 110. As noted above, in typical embodiments, rotary brake 170 is configured such that it applies the braking torque automatically in the event of a failure, such as a power failure. With such an embodiment of rotary brake 170, the automatic application of the braking torque holds stage 530 in position on track 110 in the event of such failure. In embodiments in which track 110 is vertically oriented, or has an orientation having a significant vertical component, the automatic application of the braking torque prevents stage 530 and items attached to the stage from falling down along track 110.

The size of toothed pulley 624 is selected in accordance with the intended application. Typically, an embodiment of toothed pulley 624 having a minimum possible radius is selected. Such a selection maximizes the ratio between the linear braking force applied to stage 530 and the braking torque generated by rotary brake 170, and additionally maximizes the resolution of the displacement measurements made in response to the electrical signals generated by rotary encoder 180. However, the specified minimum radius of curvature of toothed ribbon 622 imposes limitations on the minimum possible radius of toothed pulley 624 similar to those described above with reference to ribbon 522 and pulley 524. Again, idler pulley 544 can have a radius of curvature larger than that of toothed pulley 624 to reduce the bending stress on toothed ribbon 622.

In an alternative arrangement of translation apparatus 600, toothed pulley 624 is rotationally coupled only to rotary encoder 180 and idler pulley 544 is rotationally coupled only to rotary brake 170. Since the back side of toothed ribbon 622 remote from teeth 626 contacts idler pulley 544 rotationally coupled to rotary brake 170, toothed ribbon 622 should be tensioned similarly to ribbon 522 described above with reference to FIGS. 5A-5C to prevent slippage between toothed ribbon 622 and idler pulley 544 in this arrangement. In this embodiment, idler pulley 544 serves as the rotatable member rotationally coupled to rotary brake 170, and toothed pulley 624 and the section of toothed ribbon 622 extending between toothed pulley 624 and idler pulley 544 effectively couple rotary encoder 180 to the rotatable member provided by idler pulley 544.

In another alternative arrangement of translation apparatus 600, the braking force that can be applied to stage 530 by a rotary brake providing a given braking torque and a given diameter of toothed pulley 624 is increased by rotationally coupling an additional rotary brake to idler pulley 544 in addition to rotary brake 170 rotationally coupled to toothed pulley 624.

In another alternative arrangement of translation apparatus 600, a combination of fixed member 120 and rotatable member 160 independent of that which converts the motion of stage 530 to the rotation applied to the rotatable portion of rotary brake 170 is used to convert the motion of stage 530 to rotation for application to the rotatable portion of rotary encoder 180. The combination that provides the rotation coupled to rotary brake 170 may be one without positive coupling between the fixed member and the rotatable member, whereas the combination that provides the rotation coupled to rotary encoder 180 is one having positive coupling between the fixed member and the rotatable member so that the signals output by the rotary encoder accurately represent the displacement of the stage. In yet another alternative arrangement, combination 400 of toothed rack 402 as the fixed member and toothed wheel 404 as rotatable member is substituted for combination 620 of toothed ribbon 622 and toothed pulley 624, and idler pulley 544 is omitted.

In another alternative, a chain is substituted for toothed ribbon 622, and a sprocket whose teeth engage with the chain is substituted at least for toothed pulley 624. A sprocket may additionally be substituted for idler pulley 544. Alternatively, a stranded rope is substituted for toothed ribbon 622, and a grooved pulley is substituted at least for toothed pulley 624. A grooved pulley may additionally be substituted for idler pulley 544. The groove of at least the grooved pulley rotationally coupled to rotary encoder 180 is contoured to engage with the strands of the rope to provide positive coupling between the grooved pulley and the rope.

In an embodiment in which motive force generator 150 is configured as a linear motor rotor, at least one of the electrical signals generated by rotary encoder 180 may be used to control the operation of motive force generator 150. Specifically, the electrical signal is used to control the commutation of the linear motor rotor. When this is done, the radius and tooth-pitch of toothed pulley 624 are chosen to provide a defined cyclic relationship between the angular position of rotary encoder 180 and the position of stage 530 relative to the linear motor stator segments 112 arrayed along track 110.

In an example, linear motor stator segments 112 have a pitch of 24 mm and the teeth 626 of toothed ribbon 622 have a pitch of 3 mm. Since teeth 626 have a pitch of 3 mm, the teeth 628 of toothed pulley 624 also have a pitch of 3 mm. In an example, toothed pulley 624 has 16 teeth 628, and therefore has a circumference of 16×3=48 mm. Consequently, one revolution of toothed pulley 624 occurs as stage 530 travels 48 mm along toothed ribbon 622 and, hence, along track 110. This is twice the pitch of the linear motor stator segments. By selecting rotary encoder 180 such that at least one of its electrical signals undergoes two cycles per revolution, rotary encoder 180 can provide a switching signal that switches the linear motor rotor at a defined positional relationship with each linear motor stator segment. Thus, in this example, the circumference of toothed pulley 624 is selected to cause at least one of the electrical signals generated by the rotary encoder to undergo a defined number of cycles as the stage moves a defined distance along the track. In the example just described, the defined distance corresponds to the pitch of the linear motor stator segments. In another example, toothed pulley 624 has 8 teeth with a pitch of 3 mm. In this example, one revolution of toothed pulley 624 occurs as stage 530 travels 24 mm along toothed ribbon 622 and, hence, along track 110. In other examples, toothed pulley 624 has 16 teeth, 24 teeth or 32 teeth and a pitch of 3 mm, or a pitch different from 3 mm. Other numbers of teeth and tooth pitches are also possible.

In other embodiments, commutation of linear motor rotor 150 not controlled in response to the electrical signals generated by rotary encoder 180. In this case, there is no need for a fixed relationship between the position of stage 530 relative to linear motor stator segments 112 disposed along track 110 and the angular position of rotary encoder 180.

FIG. 7A is a block diagram showing an example of a system that can be used to control the motion of the stage of the translation apparatus embodiments described herein. The example of system 700 shown is composed of a system/user interface 710 and a controller 720. In the following description, stage 530 can be substituted for stage 130.

System/user interface 710 receives commands from either or both of host system and a user. The commands define various operations to be performed by the translation apparatus and, optionally, items attached to the stage thereof.

Controller 720 is typically composed of a computer and/or electronic circuitry and receives commands from system/user interface 710. Controller 720 typically constitutes part of stage 130, but alternatively may be co-located with system/user interface 710 or may be located elsewhere. Among the commands system/user interface 710 provides to controller 720 is a position specifying signal PS that specifies a destination position along track 110 to which stage 130 is to move.

In response to the commands received from system/user interface 710, controller 720 generates signals that are supplied to other elements of stage 130 to control the movement of the stage along track 110. Among the signals controller 720 provides is a force indication signal FI that is provided to motive force generator 150. Force indication signal FI specifies the magnitude and direction of the motive force that motive force generator 150 is to generate to cause movable stage 130 to move along track 110. Another of the signals that controller 720 provides is brake release signal BR that is provided to rotary brake 170. While controller 720 provides brake release signal BR to rotary brake 170, rotary brake 170 provides no braking torque, as described above, and stage 130 is free to move along track 110. When controller 720 stops providing brake release signal BR to rotary brake 170, rotary brake 170 provides the braking torque that the coupling between rotatable member 160 and fixed member 120 converts to the braking force that is applied to stage 130 to retard the movement of stage 130 along track 110.

Controller 720 additionally receives signals from other elements of stage 130. Among the signals controller 720 receives from another element of stage 130 is a position information signal PI from rotary encoder 180. In an example, position information signal PI is composed of the raw electrical signals generated by rotary encoder 180 from which controller 720 determines one or both of the position and the displacement of stage 130 along track 180. In another example, position information signal PI is a signal derived from the raw electrical signals generated by rotary encoder 180 and indicates one or both of the position and the displacement of stage 130 along track 110. Other types of position information signals are possible.

In an example of the operation of controller 720, the controller receives position specifying signal PS from system/user interface 710 as a position input signal. The position specifying signal specifies a new position of stage 130. In response to the position specifying signal and position information signal PI received from rotary encoder 180 as a position feedback signal, the controller uses a position control algorithm to generate force indication signal FI. Controller 720 supplies the force indication signal to motive force generator 150 to define the magnitude and direction of the motive force applied by motive force generator 150 to stage 130. Additionally, shortly after supplying force indication signal FI, controller 720 supplies brake release signal BR to stage 130. Brake release signal BR sets rotary brake 170 to its released stage in which the rotary brake applies no braking to stage 130. Stage 130 is then free to move in response to the motive force generated by motive force generator 150.

FIG. 7B is a timing diagram showing an example of the relative timing of force indication signal FI applied to motive force generator 150 and brake release signal BR applied to rotary brake 170. To simplify the drawing, force indication signal FI is shown simply as a binary signal: in practice, force indication signal is a multi-bit signal that defines the magnitude and direction of the motive force generated by motive force generator 150.

Initially, controller 720 generates force indicating signal FI in its 0 state and brake release signal BR is in its 0 state. The 0 state of force indicating signal FI causes motive force generator 150 to generate no motive force. The 0 state of brake release signal BR sets rotary brake 170 to its default state in which it applies braking torque to rotatable member 160. Consequently, stage 130 is at rest on track 110 held in place by the braking torque supplied by rotary brake 170 and converted by rotatable member 160 and fixed member 120 to a braking force applied to the stage. In response to receiving position specifying signal PS from system/user interface 710 defining a new destination for stage 130, at time T1, controller 720 changes force indication signal FI to its 1 state and maintains brake release signal BR in its 0 state. The 1 state of force indication signal FI causes motive force generator 150 to generate sufficient motive force to move stage 130 along track 110. In an embodiment in which track 110 is oriented vertically or is oriented with a significant vertical component, the motive force generated by motive force generator 150 is at least equal to the weight of stage 130 and items attached thereto. Stage 130 does not move in response to the motive force because it is held in place by the braking torque supplied by rotary brake 170.

After a predetermined delay time, at a time T2, controller 720 changes brake release signal BR to its 1 state and maintains force indicating signal FI in its 1 state. The 1 state of brake release signal BR sets rotary brake 170 to its released state in which it applies substantially no braking torque to rotatable member 160. Since stage 130 is now free to move in response to the motive force supplied by motive force generator 150, stage 130 accelerates along track 110. As stage 130 moves along track 110, position indicating signal PI output by rotary encoder 180 to controller 720 indicates the current position of the stage. As stage 130 moves along track 110, controller 720 performs its position control algorithm having position specifying signal PS as position input signal and position information signal PI as position feedback signal. The position control algorithm causes controller 720 to generate the signals necessary to controllably move stage 130 from its start position to the destination position specified by position specifying signal PS.

When stage 130 reaches its destination position at a time T3, controller 720 changes brake release signal BR to its 0 state and maintains force indicating signal FI in its 1 state. The 0 state of brake release signal BR allows rotary brake 170 to return to its default, active state in which it applies braking torque to rotatable member 160. The coupling between rotatable member 160 and fixed member 120 converts the braking torque to a braking force applied to stage 130. The braking force holds stage 130 in place at its destination position even though stage 130 is still subject to the motive force provided by motive force generator 150.

After a predetermined delay time, at a time T4, controller 720 changes force indicating signal FI to its 0 state and maintains brake release signal BR to its 0 state. The 0 state of force indicating signal FI causes motive force generator 150 to generate no motive force. The 0 state of brake release signal BR sets rotary brake 170 to its default state in which applies braking torque to rotatable member 160. The braking torque provided by rotary brake 170 and converted by rotatable member 160 and fixed member 120 to a braking force applied to stage 130 holds the stage at the destination position even though motive force generator 150 is no longer applying motive force to the stage.

The above-described operational sequence performed by controller 720 allows the controller to start and stop stage 130 without incurring the risk of unwanted motion of stage 130 in response to the force of gravity or inertial forces generated by movement of an item attached to the stage. Typical values of the delay time between times T1 and T2 and the delay time between times T3 and T4 are of the order of 50 milliseconds.

As noted above, in typical applications, force indicating signal FI is a multi-bit signal substantially more complex than the binary signal illustrated in FIG. 7B. In an example, between times T1 and T2, the magnitude of force indicating signal FI specifies a motive force sufficient to hold stage 130 in position, as described above. Then, after time T2, the magnitude of force indicating signal FI increases to specify a larger motive force that will accelerate stage 130 rapidly. After stage 130 has reached a specified speed, the magnitude of force indicating signal FI falls to specify a motive force sufficient to maintain stage 130 at its specified speed. Then, as the stage approaches its destination, the direction of the force indicating signal FI reverses and its magnitude increases to specify a large, reverse motive force that will decelerate stage 130 rapidly. The deceleration is such that, just before stage 130 reaches its destination position at time T3, stage 130 is almost stopped. Finally, at time T3, the magnitude and direction of force indicating signal FI revert to values that specify a motive force sufficient to hold stage 130 in position, as described above.

In the above-described embodiments of translation apparatus 100, translation apparatus 500 and translation apparatus 600, controller 720 can be implemented in hardware such as an integrated circuit having bipolar, N-MOS, P-MOS or CMOS devices. Design libraries comprising designs for circuit elements suitable for implementing the above-described functions of controller 720 are commercially available can be used to design such hardware implementations of controller 720.

Controller 720 can alternatively be implemented in pre-fabricated hardware devices such as an application-specific integrated circuit (ASIC) or a field-programmable gate array (FPGA). Design libraries comprising designs for implementing the above-described functions of controller 720 in such pre-fabricated hardware devices are commercially available can be used to configure such pre-fabricated hardware devices to implement the functions of controller 720.

Controller 720 can alternatively be implemented in software running on a suitable computational device (not shown) such as a microprocessor or a digital signal processor (DSP). Controller 720 may additionally constitute part of a digital signal processor. Programming modules capable of programming a computational device to provide the above-described functions of controller 720 are commercially available and may be used to program a computational device to provide a software implementation of controller 720. In such software implementations of controller 720, the various functions described in this disclosure are typically ephemeral, and operate only temporarily as the program executes.

The program in response to which the computational device operates can be fixed in a suitable computer-readable medium (not shown) such as a floppy disk, a hard disk, a CD-ROM, a DVD-ROM, a flash memory, a read-only memory or a programmable read-only memory. The program is then transferred from the computer-readable medium to a non-volatile memory that forms part of the computational device, or is external to the computational device. Alternatively, the program can be transmitted to the non-volatile memory of the computational device by a suitable data link.

This disclosure describes the invention in detail using illustrative embodiments. However, the invention defined by the appended claims is not limited to the precise embodiments described.

I claim:

1. A translation apparatus, comprising:
   an elongate track;
   an elongate fixed member extending parallel to the track in a fixed lengthwise position relative thereto; and
   a stage mounted on the track and capable of movement along the track, the stage comprising:
   a motive force generator operable to move the stage along the track,
   a rotatable member coupled with the fixed member in a manner that converts movement of the stage relative to the fixed member into rotation of the rotatable member, and
   a rotary brake selectively operable to apply a braking torque to the rotatable member.

2. The translation apparatus of claim 1, in which:
   the fixed member is flexible in a direction orthogonal to the length thereof;
   the rotatable member comprises a pulley; and
   the stage additionally comprises an idler pulley positioned to wrap the fixed member part-way around the pulley.

3. The translation apparatus of claim 1, in which the fixed member and the rotatable member each comprise teeth.

4. The translation apparatus of claim 1, in which the rotary brake has a default state in which the rotary brake applies the braking torque to the rotatable member and a released state in which it applies substantially no braking torque to the rotatable member.

5. The translation apparatus of claim 1, in which the rotary brake comprises a mechanically-actuated braking mechanism for generating the braking torque and an electrically-actuated mechanism for selectively disengaging the braking mechanism.

6. The translation apparatus of claim 1, in which the rotary brake comprises:
   a magnetically-actuated braking mechanism for generating the braking torque, the magnetically-actuated braking mechanism comprising a permanent magnet; and
   an electrically-actuated mechanism for selectively disengaging the braking mechanism.

7. The translation apparatus of claim 1, in which the rotary brake comprises:
   a rotatable element coupled to the rotatable member;
   a fixed element fixed to the stage, the fixed element biased into contact with the rotatable element; and
   an operating mechanism operable to move the fixed element out of contact with the rotatable element.

8. The translation apparatus of claim 1, in which the rotary brake comprises:
   a fixed element fixed to the stage;
   a rotatable element coupled to the rotatable member, the rotatable element biased into contact with the fixed element; and
   an operating mechanism operable to move the rotatable element out of contact with the fixed element.

9. The translation apparatus of claim 1, in which:
   the motive force generator comprises a linear motor rotor; and
   the translation apparatus additionally comprises a linear motor stator arrayed along the track opposite the linear motor rotor.

10. The translation apparatus of claim 1, in which the stage additionally comprises a rotary encoder coupled to the rotatable member.

11. The translation apparatus of claim 10, in which the rotatable member comprises teeth arranged along a circumference thereof and configured to engage with the fixed member.

12. The translation apparatus of claim 11, in which the fixed member comprises teeth arrayed along a length thereof, the teeth configured to engage with the teeth of the rotatable member.

13. The translation apparatus of claim 10, in which the rotatable member comprises a toothed pulley, and the fixed member comprises a toothed ribbon.

14. The translation apparatus of claim 10, in which:
the fixed member is flexible in a direction orthogonal to the length thereof and has a minimum radius of curvature; and
the rotatable member comprises a pulley having a radius no less than the minimum radius of curvature of the fixed member.

15. The translation apparatus of claim 10, in which:
the fixed member comprises a rack, the toothed rack rigid in a direction orthogonal to the length thereof and comprising teeth arrayed therealong;
the rotatable member comprises a toothed wheel comprising teeth configured to engage with teeth of the rack.

16. The translation apparatus of claim 1, in which:
the fixed member is flexible in a direction orthogonal to the length thereof and comprises teeth arrayed therealong;
the rotatable member comprises a pulley; and
the stage additionally comprises:
a toothed pulley positioned to wrap the fixed member part-way around the pulley, the toothed pulley comprising teeth configured to engage with the teeth of the fixed member, and
a rotary encoder rotationally coupled to the toothed pulley 17. A stage movable in translation relative to an elongate fixed member, the stage comprising:
an armature;
a motive force generator fixed to the armature and operable to move the stage relative to the fixed member;
a rotatable member configured to couple with the fixed member in a manner that converts movement of the stage relative to the fixed member to rotation of the rotatable member;
a rotary brake fixed to the armature and having a default state in which the rotary brake applies a braking torque to the rotatable member, the coupling between the rotatable member and the fixed member converting the braking torque to a braking force applied to the stage; and
a rotary encoder coupled to the rotatable member to quantify the rotation thereof.

18. The stage of claim 17, additionally comprising a controller operable to perform operations comprising:
causing the rotary brake to release;
causing the motive force generator to generate a motive force effective to move the stage along the fixed member, and
determining a displacement of the stage relative to the fixed member in response to a signal received from the rotary encoder.

19. The stage of claim 18, in which the controller is additionally operable to inhibit release of rotary brake unless the controller is causing the motive force generator to generate the motive force.

20. The stage of claim 17, in which the controller is additionally operable to control operation of the motive force generator in response to the signal received from the rotary encoder.

* * * * *

UNITED STATES PATENT AND TRADEMARK OFFICE
CERTIFICATE OF CORRECTION

PATENT NO.       : 8,146,718 B2                              Page 1 of 1
APPLICATION NO.  : 12/241437
DATED            : April 3, 2012
INVENTOR(S)      : Wagner It is certified that error appears in the above-identified patent and that said Letters Patent is hereby corrected as shown below:

In column 19, lines 34-35, in Claim 16, delete "pulley" and insert -- pulley. --, therefor.

Signed and Sealed this
Fifteenth Day of May, 2012

David J. Kappos
*Director of the United States Patent and Trademark Office*